Oct. 21, 1924.  
C. H. WHITE  
DISK HARROW  
Original Filed Sept. 11, 1920
1,512,258
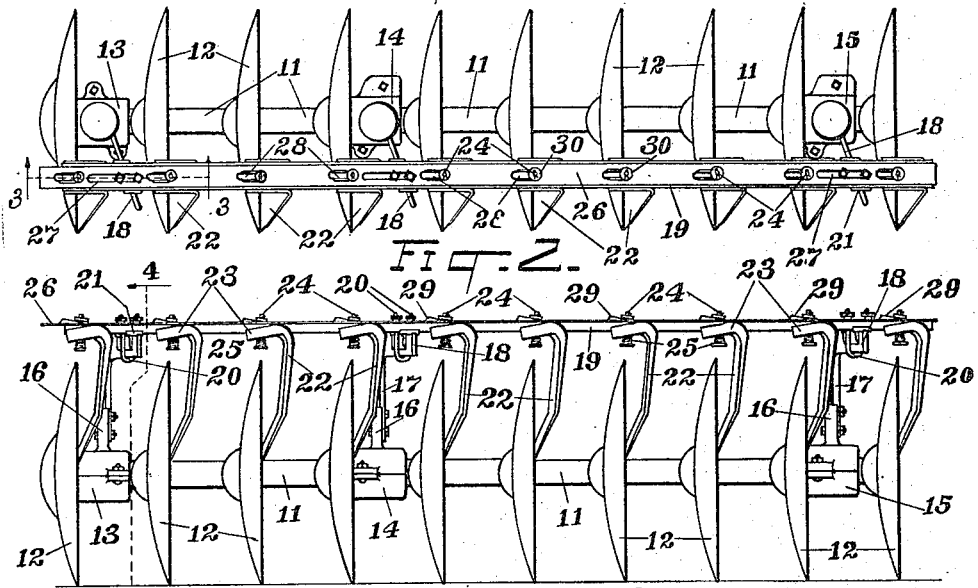
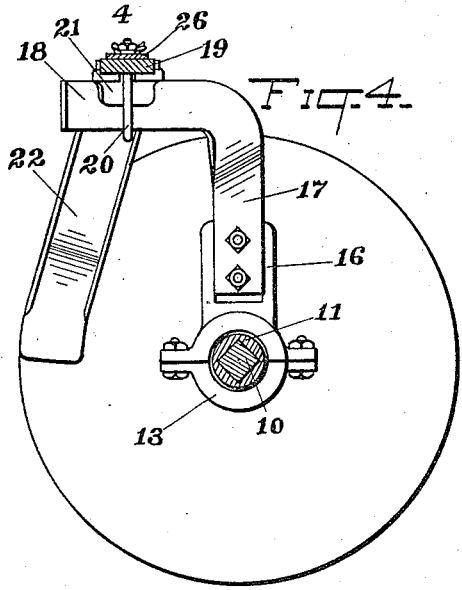
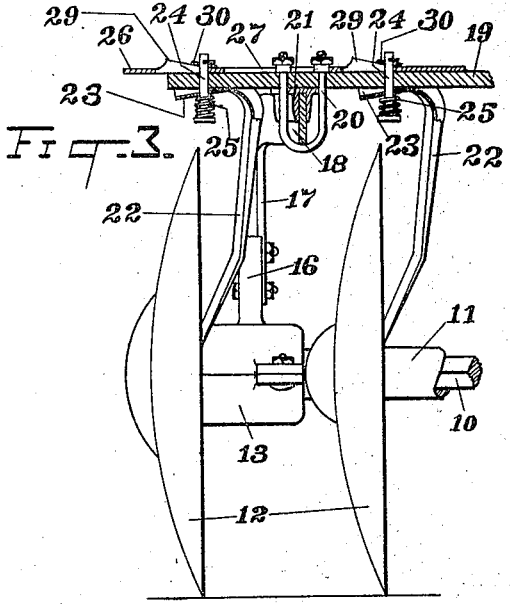
Witness  
E. Wilderson
Inventor  
Charles H. White  
by Adams & Jackson  
Attorney Patented Oct. 21, 1924.

1,512,258

UNITED STATES PATENT OFFICE.

CHARLES H. WHITE, OF MOLINE, ILLINOIS, ASSIGNOR TO DEERE & COMPANY, OF MOLINE, ILLINOIS, A CORPORATION OF ILLINOIS.

DISK HARROW.

Application filed September 11, 1920, Serial No. 409,634. Renewed May 31, 1923.

*To all whom it may concern:*

Be it known that I, CHARLES H. WHITE, a citizen of the United States, and a resident of Moline, in the county of Rock Island and State of Illinois, have invented certain new and useful Improvements in Disk Harrows, of which the following is a specification, reference being had to the accompanying drawings.

My invention relates to disk harrows and particularly to the means by which a series of scrapers are mounted in position to bear upon the disks at their rear edge portions. It is the object of my invention to provide new and improved means for mounting scrapers so as to have the desired pressure upon the disks; to so construct that portion of each scraper shank that the securing means therefor engages that while it may rockingly engage a supporting bar it will be effectually held from any twisting action relative to such supporting bar; and to provide new and improved means for regulating by a single operation the pressure of the several scrapers of a gang. The preferred means by which I have accomplished my object is illustrated in the drawings and hereinafter described. That which I believe to be new and desire to cover by Letters Patent is set forth in the claims.

In the drawings,—

Fig. 1 is a top plan view of a gang of disks provided with my improvements;

Fig. 2 is a rear view of the parts shown in Fig. 1;

Fig. 3 is an enlarged detail, being a section taken on line 3—3 of Fig. 1; and

Fig. 4 is a vertical cross-section taken on line 4—4 of Fig. 2.

Referring to the drawings,—10 indicates a shaft which is square in cross-section mounted within a sleeve 11 which has rigidly mounted thereon a plurality of ground-working disks 12 of any approved type. Two-part boxes, indicated respectively by 13, 14, 15, are clamped over the sleeve 11 and serve as bearings for such sleeve. Each of the boxes is provided with an upwardly-extending arm 16 from which rises a standard 17. Each of the standards 17 has a rearwardly-extending arm 18 at its upper end, which, in the construction shown, is formed integrally with the standard. As best shown in Fig. 1, these rearwardly-extending arms 18 are also inclined in a lateral direction, the several arms being parallel with each other. A frame bar 19 is rigidly mounted upon the arms 18 by means of U-bolts 20 which pass about the arms 18 and through suitable openings in the bar 19, bearing plates 21 of any suitable type being interposed between the arms 18 and the bar 19, as is best shown in Fig. 3.

Scrapers 22 having blade portions engaging the faces of the disks 12, respectively, are movably mounted upon the bar 19. As is best shown in Fig. 3, each of the scrapers 22 comprises a laterally-extending arm 23 which has a rounded connection with the scraper, such arm being formed integral with its scraper, in the construction shown. As is shown in said Fig. 3, the arm 23 of each of the scrapers is in the form of a channel which embraces the bar 19 so as to hold the scraper against a twisting movement with respect to the disk and the bar 19 that the channel-shaped arm engages. The scrapers are mounted in position by means of bolts 24 which pass through suitable openings in the arms 23 and bar 19, coiled springs 25 being interposed between the arms 23 and the heads of the bolts 24. By providing the scrapers 22 with laterally-rounded bearing portions, and securing the scrapers in position by means comprising the springs 25, I have provided a construction that permits the scrapers to swing laterally toward and from the faces of the several disks and be held normally in contact with the disks by the pressure of the springs.

Means are provided for adjusting the springs 25 for varying the pressure of the blades of the scrapers upon the faces of the disks, such means, in the construction shown, comprising a bar 26 which is slidably mounted upon the bar 19, being held in position thereon by means of the said bolts 20 and 24 which pass through suitable slots therein. In the construction shown the slots provided in the bar 26 for the bolts 20 are indicated by 27, and the slots for the bolts 24 are indicated by 28. As is clearly shown in Figs. 2 and 3, the bar 26 is provided with cams 29 adjacent to the slots 28, in the construction shown the cams 29 being in the form of turned up portions formed integrally with the bar. As will be readily understood, upon a movement of the bar 26 toward the right as viewed in Fig. 3, the bolts 24 will be moved slightly upward and thus through the compression of all the springs 25 causing a rocking movement of the scrapers by reason of their respective curved bearing portions that are in contact with the under face of the bar 19. The increased tension thus put upon the springs of course increases the pressure of the scrapers against the discs and the degree of such pressure can be regulated by the extent to which the bar 26 is longitudinally shifted. Engagement between the bolts 24 and the cams 29 is effected by means of washers 30 held in position upon the bolts by suitable pins.

The position of the bar 26 upon the bar 19 is controlled and adjusted by the use of any suitable means, not shown. As will be readily understood, upon an adjustment of the bar 26, the scrapers 22 of the whole gang are adjusted in position in unison with respect to the disks so as to vary the pressure of the blades thereon. It is desirable that the scrapers be adapted to be moved into different effective positions that will adapt them to engage at any desired places on the disks, so as to properly function at all times regardless of the character of the soil conditions. By reason of the scraper-carrying bar 19 resting upon the rearwardly-extending members 18 of the fixed arms 17 and being connected with such arms by the U-bolts 20, it will be apparent that by adjusting such bar along such arm members 18 the various scrapers will be so moved fore or aft as to carry them toward or from the edges of the disks. Furthermore, by reason of such bar-supporting members 18 being laterally inclined and parallel with each other, and their inclination being such as to approximately correspond with the inclination of the concave faces of the disks, it will be further apparent that as the scraper-carrying bar 19 is adjusted along such fixed and laterally-inclined supporting members 18 it is so guided as to be given an endwise movement that will move the several scrapers laterally, whereby they will continue to bear against their respective disks with practically no change in pressure from that that was exerted by them before such change in position was made. As will be understood, the loosening of the nuts on the clamping bolts 20 permits the desired change of position of the scraper-carrying bar on the guiding and supporting arm members 18, such nuts being screwed down again when the bar has been adjusted to its new position.

What I claim as my invention and desire to secure by Letters Patent, is—

1. In combination, a frame comprising a transversely-extending bar, a rotatable disk connected therewith, a scraper depending from said bar and having at its upper end a turned channel-shaped member lying opposite a face of said bar with the flanges thereof opposite the sides of the bar, and means for securing said channel-shaped member to said bar.

2. In combination, a frame comprising a transversely-extending bar, a rotatable disk connected therewith, a scraper depending from said bar and having at its upper end a turned channel-shaped member lying opposite a face of said bar with the flanges thereof opposite the sides of the bar, and yielding means for securing said channel-shaped member to said bar.

3. In combination, a frame comprising a transversely-extending bar, a rotatable disk connected therewith, a scraper depending from said bar and having at its upper end a turned channel-shaped member lying opposite a face of said bar with the flanges thereof opposite the sides of the bar, the face of that portion of the scraper adjacent to the inner end of said arm being rounded to form a rocking bearing in contact with said bar, and means for yieldingly connecting said arm with said bar.

4. In combination, a framework, a disk rotatably mounted with respect to said framework, a scraper having a laterally-rounded bearing portion at its upper end, a channel-shaped arm beyond said rounded bearing portion adapted to partially surround a member of said framework and means connecting said scraper with said framework serving to permit said scraper to roll sidewise on said rounded portion toward and away from the face of the disk.

5. In combination, a framework, a disk rotatably mounted with respect to said framework, a scraper comprising a laterally-extending arm having a rounded connection therewith, said arm being channel-shaped to partially surround a member of said framework, and means securing said arm to said framework adapted to permit the scraper to roll on said rounded portion for swinging its blade portion toward and away from said disk.

6. In combination, a framework, a disk rotatably mounted with respect to said framework, a scraper comprising a laterally-extending arm having a rounded connection therewith, said arm being channel-shaped to partially surround a member of said framework, and means securing said arm yieldingly in position on said framework and serving to hold said scraper normally in contact with the face of the disk.

7. In combination, a framework, a disk rotatably mounted with respect to said framework, a scraper comprising a laterally-extending arm having a rounded connection therewith, said arm being channel-shaped to partially surround a member of said framework, yielding means securing said arm in position on said framework and serving to hold the scraper normally in contact with the face of the disk, and means for adjusting said yielding means for increasing the pressure of said scraper on said disk.

8. In combination, a framework, a disk rotatably mounted with respect to said framework, a scraper comprising a laterally-extending arm having a rounded connection therewith, said arm being channel-shaped to partially surround a member of said framework, a bolt passing through said arm and a portion of said framework, a coiled spring interposed between said arm and the head of said bolt adapted to press said scraper against the face of said disk, and means for adjusting the position of said bolt in said framework for increasing the pressure of said scraper on said disk.

9. In combination, a framework, a plurality of disks rotatably mounted with respect to said framework, a plurality of scrapers bearing on the faces of said disks respectively and adapted to swing laterally with respect thereto, a bar movably mounted on said framework, a plurality of cams on said bar, and means actuated by said cams upon a movement of the bar for swinging said scrapers in unison for varying the pressure of the scrapers upon the disks.

10. In combination, a framework, a plurality of disks rotatably mounted with respect to said framework, a plurality of scrapers bearing on the faces of said disks respectively and adapted to swing laterally with respect thereto, a spring for each of said scrapers normally pressing it against the adjacent disk, a bar slidingly mounted on said framework adjacent to said disks, a plurality of cams on said bar, and means actuated by said cams upon a movement of said bar for adjusting said several springs in unison for varying the pressure of said scrapers upon said disks.

11. In combination, a framework, a plurality of disks rotatably mounted with respect to said framework, a plurality of scrapers each having a laterally-rounded bearing portion at its upper end, means connecting said scrapers with said framework in position to bear upon the faces of said disks respectively and adapted to permit the scraper to roll upon the rounded bearing portion for swinging the blade portion laterally with respect to the disk, a bar movably mounted on said framework, and means actuated by a movement of said bar for swinging said scrapers in unison for varying the pressure of the blades upon said disks.

12. In combination, a framework, a plurality of disks rotatably mounted with respect to said framework, a plurality of scrapers each having a laterally-rounded bearing portion at its upper end, means connecting said scrapers with said framework in position to bear upon the faces of said disks respectively and adapted to permit the scraper to roll upon the rounded bearing portion for swinging the blade portion laterally with respect to the disk, springs pressing the several scrapers against the disks, a bar slidably mounted on said framework, a plurality of cams on said bar, and means actuated by said cams upon a movement of the bar for adjusting said several springs in unison for varying the pressure of said scrapers upon said disks.

13. In combination, a framework, a plurality of disks rotatably mounted with respect to said framework, a plurality of scrapers each comprising a laterally-extending arm having a rounded connection therewith, means securing said arms to said framework adapted to permit the scrapers to roll on their rounded portions for swinging their blade portions laterally toward and from the faces of said disks respectively, a bar movably mounted on said framework, and means actuated by the movement of said bar for swinging said scrapers in unison for varying the pressure of the blades on said disks.

14. In combination, a framework, a plurality of disks rotatably mounted with respect to said framework, a plurality of scrapers each comprising a laterally-extending arm having a rounded connection therewith, means securing said arms to said framework adapted to permit the scrapers to roll on their rounded portions for swinging their blade portions laterally toward and from the faces of said disks respectively, springs pressing the several scrapers against the disks, a bar slidably mounted on said framework, a plurality of cams on said bar, and means actuated by said cams upon a movement of the bar for adjusting said several springs in unison for varying the pressure of said scrapers upon said disks.

15. In combination, a framework, a plurality of disks rotatably mounted with respect to said framework, a plurality of scrapers each comprising a laterally-extending arm having a rounded connection therewith, bolts passing through said arms and through a portion of said framework, coiled springs interposed between said arms and the heads of said bolts respectively adapted to press said scrapers against the faces of the respective disks, and means for adjusting the position of said bolts in unison for varying the pressure of said scrapers upon said disks.

16. In combination, a framework, a plurality of disks rotatably mounted with respect to said framework, a plurality of scrapers each comprising a laterally-extending arm having a rounded connection therewith, bolts passing through said arms and through a portion of said framework, coiled springs interposed between said arms and the heads of said bolts respectively adapted to press said scrapers against the faces of the respective disks, a bar movably mounted on said framework having openings through which said bolts pass, and means actuated by a movement of said bar for adjusting the position of said bolts in unison for varying the pressure of said scrapers on said disks.

17. In combination, a framework, a plurality of disks rotatably mounted with respect to said framework, a plurality of scrapers each comprising a laterally-extending arm having a rounded connection therewith, bolts passing through said arms and through a portion of said framework, coiled springs interposed between said arms and the heads of said bolts respectively adapted to press said scrapers against the faces of the respective disks, a bar slidably mounted on said framework and having slots through which said bolts pass, and means actuated by a movement of said bar longitudinally of itself for adjusting the position of said bolts in unison for varying the pressure of said scrapers on said disks.

18. In combination, a framework, a plurality of disks rotatably mounted with respect to said framework, a plurality of scrapers each comprising a laterally-extending arm having a rounded connection therewith, bolts passing through said arms and through a portion of said framework, coiled springs interposed between said arms and the heads of said bolts respectively adapted to press said scrapers against the faces of the respective disks, a bar slidably mounted in said framework, and cams on said bar adapted by engagement with said bolts upon a sliding movement of said bar to adjust the position of the bolts for varying the pressure of the scrapers on said disks.

19. In combination, a framework, a plurality of disks rotatably mounted with respect to said framework, a plurality of scrapers each comprising a laterally-extending arm having a rounded connection therewith, bolts passing through said arms and through a portion of said framework, coiled springs interposed between said arms and the heads of said bolts respectively adapted to press said scrapers against the faces of the respective disks, a bar slidably mounted on said framework and having slots through which said bolts pass, and cams on said bar adjacent to said slots adapted by engagement with said bolts upon a sliding movement of said bar to adjust the position of the bolts for varying the pressure of the scrapers upon said disks.

20. The combination of a plurality of rotatable disks, a bar arranged substantially parallel with the axis of said disks, scrapers carried by said bar for engaging respectively with said disks, a plurality of parallel fixed supporting arms projecting to one side of such axis and to which arms said bar is connected, and means for securing said bar at different points on said arms to position the scrapers at varying distances from said axis.

21. The combination of a plurality of rotatable disks each having a concave surface, a bar arranged substantially parallel with the axis upon which said disks rotate, scrapers carried by said bar for engaging respectively with the concave surfaces of said disks, a plurality of parallel fixed and laterally inclined supporting and guiding arms extending to one side of said axis, means for slidingly connecting said bar to said inclined arms whereby when said bar is moved along said arms the scrapers will be simultaneously moved in two directions, and means for securing said bar against movement.

22. The combination of a plurality of rotatable concavo-convex disks, a bar arranged substantially parallel with the axis of said disks, scrapers carried by said bar for respectively engaging with the concave surfaces of said disks, fixed laterally-inclined guiding means with which said bar is in movable engagement and adapted when said bar is moved relatively thereto to simultaneously adjust the scrapers to varying distances from said axis and also move them parallel with said axis, and means for clamping said bar in place in any of its adjusted positions.

23. The combination of a plurality of rotatable concavo-convex disks, a bar arranged substantially parallel with the axis of said disks, scrapers carried by said bar for respectively engaging with the concave surfaces of said disks, fixed laterally-inclined guiding means with which said bar is in movable engagement and adapted when said bar is moved relatively thereto to simultaneously adjust the scrapers to varying distances from said axis and also move them parallel with said axis, means for clamping said bar in place in any of its adjusted positions, and yielding means for maintaining a substantially uniform pressure of the scrapers against the disks irrespective of the changes of positions of the scrapers.

CHARLES H. WHITE.